May 19, 1942.  A. H. BOILEAU  2,283,487
ICE CREAM FREEZER
Filed Jan. 26, 1939   5 Sheets—Sheet 1
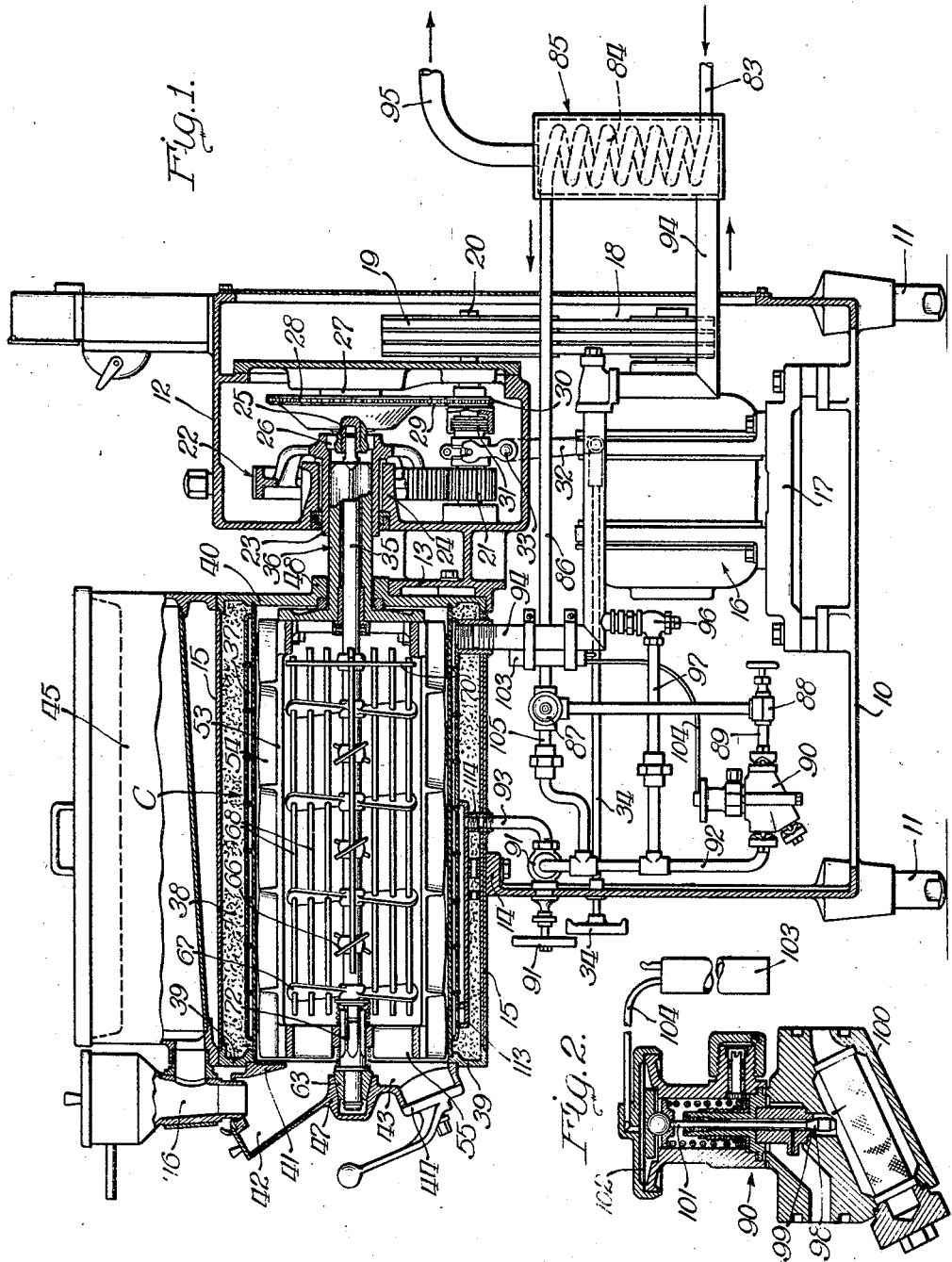
INVENTOR.
Arthur H. Boileau
BY
Norman E. H. Heletzke
ATTORNEY.

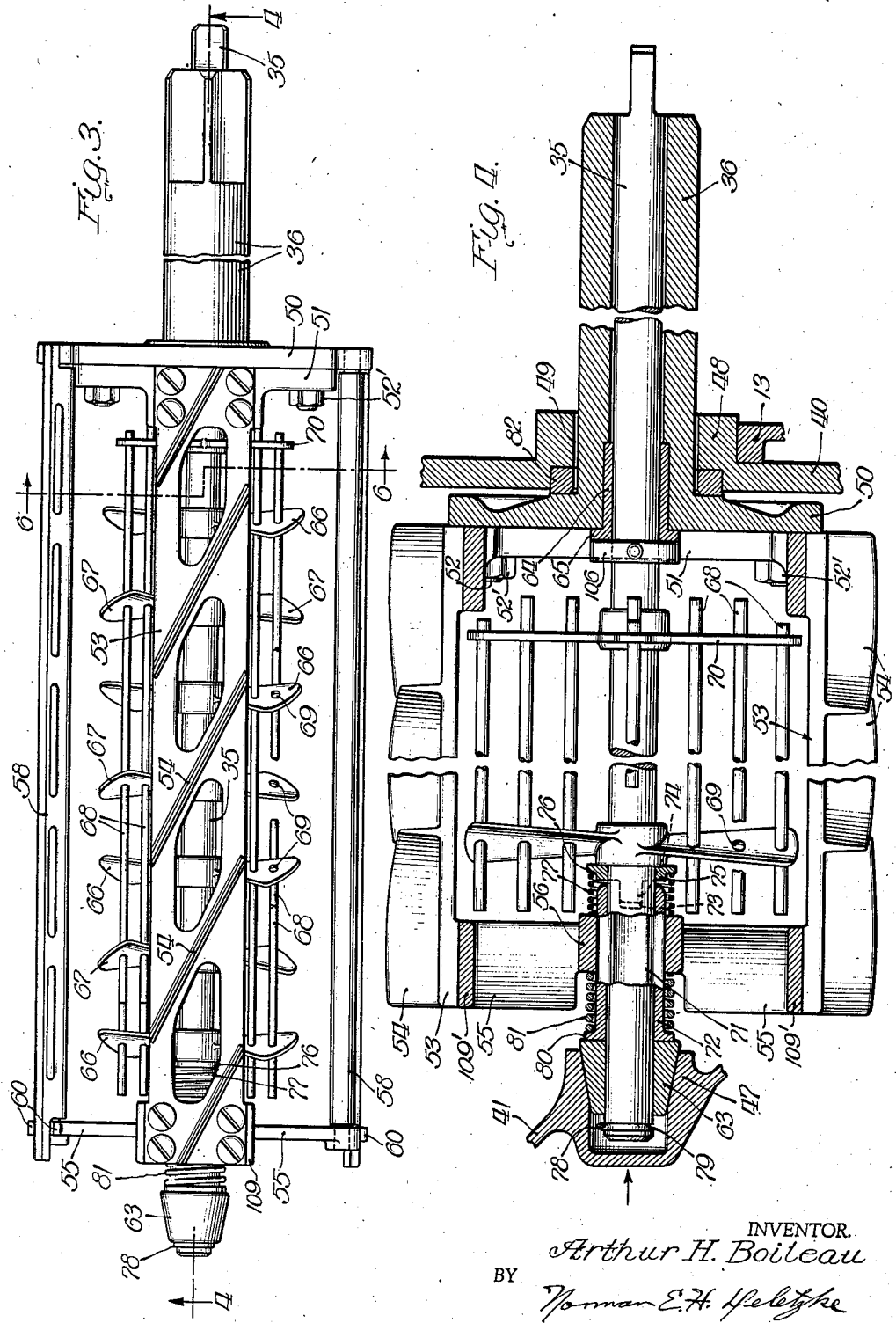

May 19, 1942.  A. H. BOILEAU  2,283,487
ICE CREAM FREEZER
Filed Jan. 26, 1939   5 Sheets-Sheet 3

INVENTOR.
Arthur H. Boileau
BY Norman E. H. Peletyhe
ATTORNEY.

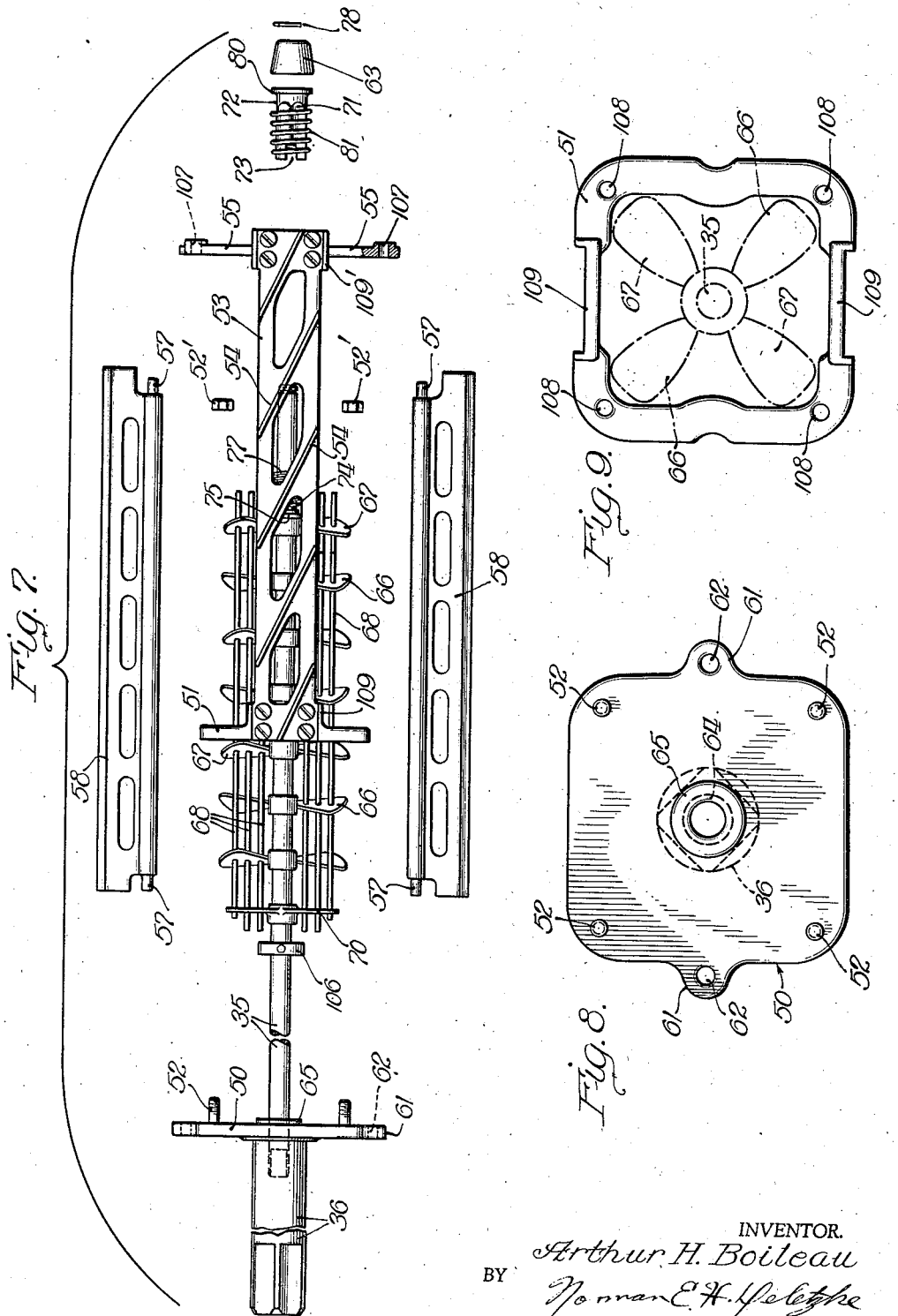

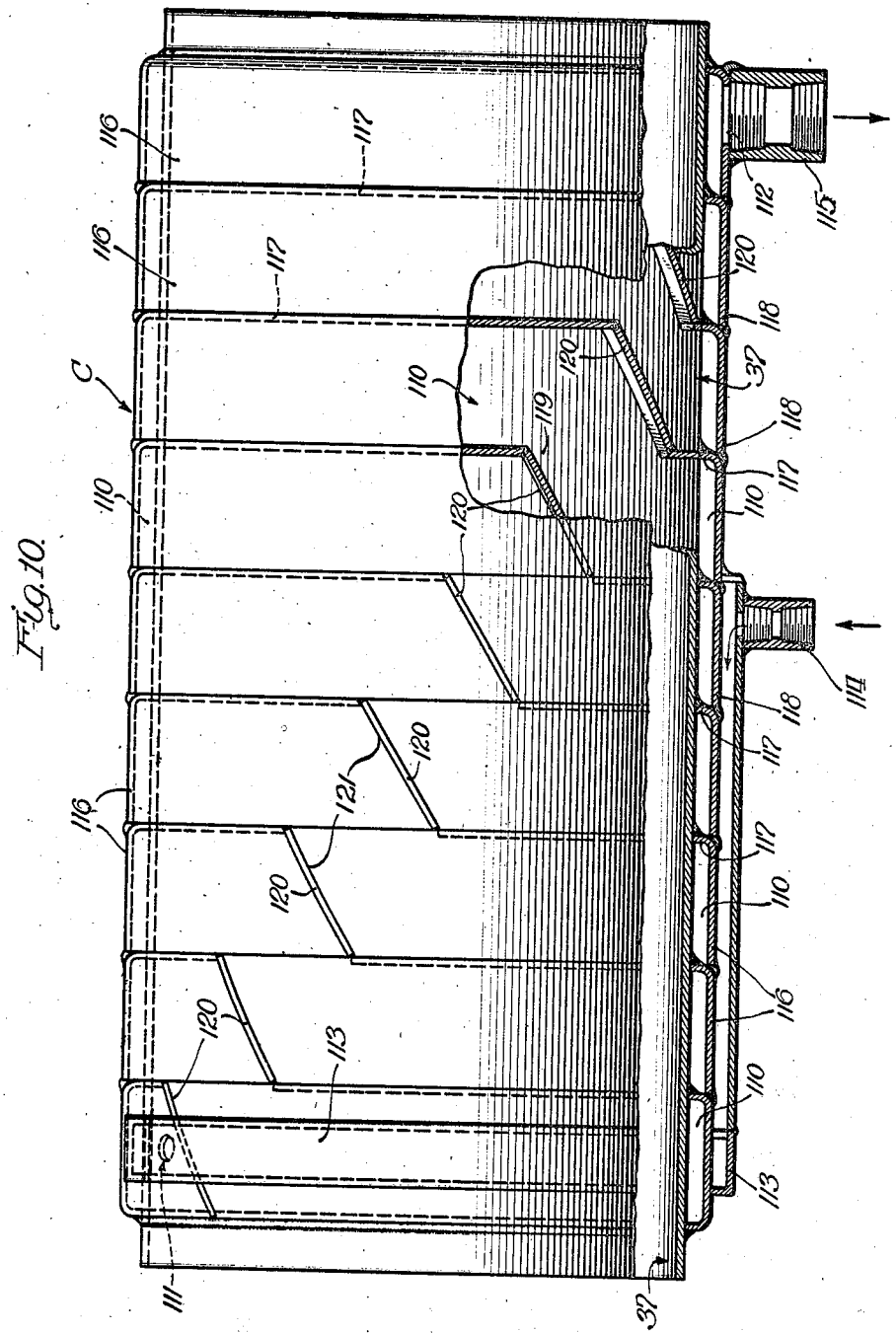

Patented May 19, 1942

2,283,487

UNITED STATES PATENT OFFICE 2,283,487

ICE CREAM FREEZER

Arthur H. Boileau, Cedar Rapids, Iowa, assignor to Cherry-Burrell Corporation, Wilmington, Del., a corporation Application January 26, 1939, Serial No. 252,884

10 Claims. (Cl. 259—9)

The present invention relates to confection freezers, such as ice cream freezers, and more particularly to a new and novel sanitary agitating mechanism, means for rotatively mounting the agitating mechanism and sealing the same within the processing chamber; to the construction of the evaporator associated with the freezing chamber, and to the means for putting the evaporator quickly into and out of operation at will.

The evaporator associated with the freezing chamber and the method of making the evaporator as well as the means for putting the evaporator quickly into and out of operation at will are specifically set forth and claimed in my copending divisional application Serial No. 310,892, filed December 26, 1939.

In ice cream freezers of the type referred to, such, for example, as direct expansion batch freezers of the horizontal cylinder type, it is essential that the ice cream mix agitating mechanism be of a sanitary construction, easily removed from the cylinder and easily cleaned; and in which all of the agitating, scraping, beating and unloading mechanism is provided in a form free from unsanitary crevices, etc. In the operation of such a machine, it is also essential that the openings, through which the driving and supporting shafts enter the freezing chamber for the operation and support of the agitating mechanism therein, be satisfactorily and sanitarily sealed, whereby the easy removal of the agitating mechanism from the processing chamber and dismantling thereof for cleaning purposes are facilitated. It is also essential in a freezer of the type referred to that the evaporator and the means for quickly putting the refrigeration action into and out of operation be adaptable to the quick repeated operation incidental to the normal use of batch freezers, attaining maximum efficiency almost instantaneously, and subject to close regulation of the operator. The accompanying drawings illustrate the invention in an ice cream freezer of this type; however, the invention is not to be limited to the specific embodiment disclosed.

The principal objects of the present invention are to provide an ice cream freezer of simple, efficient design wherein the operator has close control of the freezing process and the operation of the freezing mechanism; in which the inner agitator or whipping device is firmly but removably retained in operative position in the outer agitator device by automatically adjustable spring loaded mechanism, rotatively sealing the inner and outer agitating mechanism one to another at the entrance into the processing chamber of the driving and supporting mechanism for the inner dasher; in which the combined inner and outer agitator mechanism when assembled in the the freezer is firmly but removably maintained in operative position and rotatively sealed to the end plate of the processing chamber around the entrance aperture for the compound agitator driving mechanism by automatically adjustable spring loaded mechanism, and in which the inner and outer dasher and scraper mechanisms are separately driven with a special selective drive for the inner dasher mechanism.

A further object of the invention resides in the method of making the evaporator associated with the processing chamber in which the outer evaporator shell is affixed to the outer wall of the processing chamber in a manner utilizing the affixing elements as guide means for the refrigerant being circulated through the evaporator, and also utilizing the affixing means as fins on the outer surface of the processing chamber to facilitate the more efficient heat transfer to the refrigerant medium.

An additional object is to provide an evaporator for a processing chamber in which the evaporator is so constructed and arranged as to directly apply the volatile refrigerant to the surface of the processing chamber in intimate contact therewith and guide the refrigerant in a circuitous path thereabout, whereby, due to the pressure caused by the gas of evaporation, high speed is attained in the motion of the refrigerant, which high speed of the refrigerant causes it to pass in intimate securing contact over the outer surface of the processing chamber and the adjoining surfaces of the evaporator shell and fins formed thereon, to effect thereby a separation of the liquid from the gaseous refrigerant and the removal of gas bubbles from the surface of the heat transfer elements. Such construction effects an improvement in the rate of heat transfer from the materials being treated in the processing chamber to the refrigerant medium circulated thereabout.

A still further object of this invention is to provide means to deliver volatile refrigerant to the evaporator casing about the processing chamber and to receive it therefrom whereby intermittent, prompt operation of the refrigeration system at maximum capacity without discharging unused refrigerant to the compression may be secured, as well as to precool the liquid refrigerant before it enters the evaporator by the use of unevaporated refrigerant discharged from the processing chamber evaporator.

Other objects and purposes and other important features of the invention will be apparent from the following description when read in connection with the accompanying drawings in which:

Figure 1 is a longitudinal section view taken vertically through the freezer.

Figure 2 is a section view taken vertically through the automatic thermal refrigerant valve for the freezer.

Figure 3 is a plan view of the completely assembled agitation mechanism with one set of unloading wings turned uppermost.

Figure 4 is an enlarged detail section view of the front and rear portion of the agitating mechanism and supporting bearings taken vertically through the dasher along line 4—4 of Figure 3.

Figure 7 is a view of the various elements of the agitating mechanism in dismantled arrangement separated in relative position of assembly.

Figure 8 is an elevation view of the inner face of the rear portion of the separable rear end plate or dasher supporting member.

Figure 9 is an elevation view of the inner face of the front portion of the separable rear end plate or dasher supporting member.

Figure 10 is an elevation view in partially broken away section, showing the evaporator embracing the processing cylinder of the ice cream freezer.

I. Freezer support and driving mechanism

Figure 5:
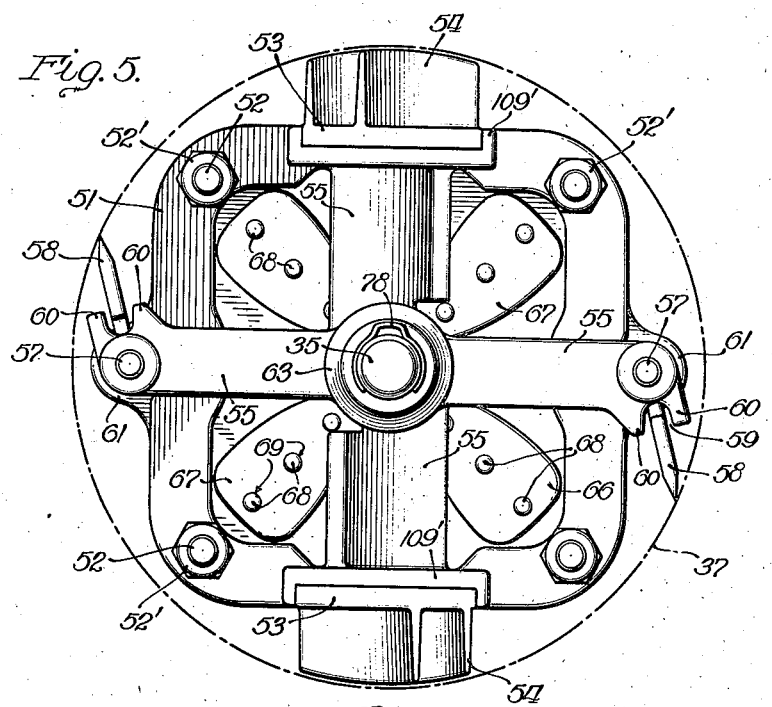
Figure 5 is an end view of the agitating mechanism showing the inner surface of the freezer in dotted lines and the relation of the scraping mechanism thereto when the freezer is in operative condition.
Figure 6:
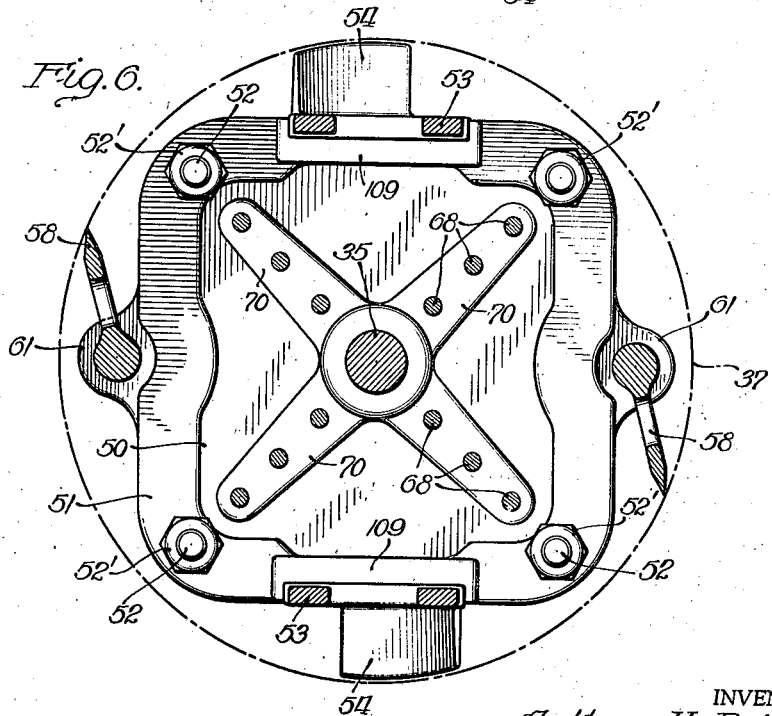
Figure 6 is a transverse elevation view of the agitating mechanism taken along the line 6—6 of Figure 3.

Referring to the illustrations showing the preferred embodiment of the invention, in which illustrations like numerals are associated with like elements, the invention in its preferred form, as illustrated in Figure 1, comprises an ice cream freezer supported on a hollow base 10 resting on adjustable feet 11. A gear housing 12 is provided at the upper rear portion of the base, and a cylinder supporting bracket 13 is provided immediately ahead of the gear housing 12, together with a cylinder supporting shelf portion 14 immediately ahead of the bracket 13, above which shelf is mounted the cylinder structure generally indicated by the numeral 15 applied to its envelope. The freezer is driven by motor 16 housed in the hollow base 10 and mounted on any suitable bracket 17. The motor 16 through a series of belts 18 drives the pulley 19 which is keyed to drive shaft 20 journaled in suitable bearings in the gear housing 12. Pinion 21 is carried by and keyed to the drive shaft 20 and drives the spur gear 22 carried by a quill shaft 23 journaled in any suitable sleeve bearing 24 mounted directly above drive shaft 20 with the quill shaft 23 opening outwardly through the front wall of the gear housing 12. Quill shaft 23 is joined at its inner end to the adjoining free inner end of a second axially aligned shaft 25, which is partially telescoped into quill shaft 23 and there supported in alignment by a suitable rotary thrust bearing 26. The outer end of the shaft 25 is journaled in any suitable bearing generally indicated by the numeral 27. Sprocket wheel 28 fixed to and carried by shaft 25 is driven by sprocket chain 29 which passes around a driving sprocket 30 driven through the intermediacy of the disc clutch generally indicated by the numeral 31 on which it is mounted. Disc clutch 31 is mounted on the drive shaft 20 and actuated by lever 32 pivoted at 33 and hinged at its free end to the control rod 34 extending outwardly through the front wall of the base 10 toward the position occupied by an operator of the freezer.

The inner shaft 35 and quill shaft 36 are the shafts used to drive the inner and outer elements of the reversely rotating agitating mechanism of the freezer. These shafts are telescoped at their free ends into the squared sockets of the shafts 25 and 23 respectively by means of which squared faces the reversely rotating spur gear 22 and sprocket wheel 28 impart the reverse rotation to the shafts 36 and 35 respectively to operate the inner and outer dasher elements.

II. Freezing tube and evaporator

The processing cylinder construction comprises an outer envelope 15 and an inner processing shell 37 which serves as a refrigerated wall or cylinder housing the freezing chamber of the freezer. The shell 37 is surrounded by a refrigerant evaporator "C" in intimate contact therewith and spaced from envelope 15, in which space a satisfactory cover or insulation 38 is provided. Shell 37 is provided at its front end with an annular head 39, and at its opposite end with a centrally apertured head 40. Heads 39 and 40 are affixed to shell 37 and envelope 50 by any suitable means, such, for example, as welding, and head 40 is rigidly affixed to the cylinder support bracket 13 by a series of bolts. A removable end wall or door 41 including the usual inlet passage 42 and outlet passage 43 is hinged in the conventional manner to the front cylinder head 39. The outlet passage 43 is closed by valve 44, and the inlet passage 42 is associated with the usual type of mix reservoir 45 through the conventional type of valve 46 all of which are clearly shown in Figure 1. The end wall 41 is provided with a conical, central, inwardly directed bearing support 47 which supports the front end of the agitator mechanism within the shell 37.

The evaporator C comprises a helical evaporator passage defined on its inner surface by the outer periphery of shell 37 and on its outer surface by a series of angularly split hoops or ring-like elements 116. The elements 116 are superimposed over the shell 37, joined one to the other by welding the front edge 118 of each element to the adjacent rear edge of the preceding element, mounted upon shell 37 and in spaced relation thereto by the inwardly turned flanges 117 along the rear edge of each element 116. Flanges 117 are in turn welded along their inner edge to the outer periphery of shell 37, and each flange 117 is provided with an interruption or slot 119 approximately equal to the width of the ring 116 and immediately adjacent the ends 121 of the ring-like elements 116 along the line of cleavage of the split rings and advancing in a clockwise direction therefrom. To complete the helical passage 110, defined on its inner and outer surface by the shell 37 and the joined ring-like elements 116, and defined along its edges by the adjacent flange 117, baffle elements 120 are provided intermediate the flanges and intermediate the adjacent slots 119. The baffle elements 120 are inclined to the plane of the elements 116 and are mounted immediately adjacent edge 121 of each of the rings 116, having their inner edge welded to the periphery of shell 37 and their outer edge welded to and joining the angularly cut ends 121 of the ring 116. The forward end of each baffle element 120 is joined to the end of a flange 117 defining the lower edge of the associated slot 119 immediately ahead of the baffle element, and the rear edge of each baffle 120 is joined to the adjacent end of a flange 117 defining the upper edge of the adjacent, rearwardly positioned slot 119. By so joining the opposite ends of adjacent flanges 117 the helical passage 110 intermediate adjacent portions of the flange 117 is defined. The helical passage 110 is provided with an inlet port 111 at its front upper end, and discharge port 112 at its lower opposite end. Liquid refrigerant is supplied to inlet port 111 through conduit 113 affixed to the outer surface of the evaporator C, and communicating with conduit 93 through nipple 114. Evaporated or gaseous refrigerant is discharged from passage 110 to the discharge port 112 joined by nipple 115 to the refrigerant discharge conduit 94.

The foremost or front shell 116 is also provided with an inwardly turned flange 117 at its front edge 118 as well as its rear edge, both of which flanges 117 are welded to the outer periphery of shell 37 to their inner edges to complete the enclosure of passage 110. To form a continuous helical passage utilizing the annular space between the shell-like structures 116 and the shell 37 when assembled as just described, each flange 117, excepting the front flange of the front shell and the flange of the rear shell, is provided with a slot or bypass 119, as just described, joining the annular space on either side of the slotted flange 117. These slots are of approximately the same length as the width of the shells 117 and are arranged in staggered relation, progressing uniformly rearwardly and downwardly with the slots of the first shell 116 near the top of the shell 37, and the slot in the second to the last shell 116 slightly passing the lower portion of the shell 37. To complete the helical passage 110, baffle means 120 are provided intermediate adjacent flanges 117 at an incline to the axis of the shell 116, joining the lower edges of a slot 119 with the upper edge of the adjacent rearwardly positioned slot 119 as just described. The baffle means 120 in the foremost and rearmost shells 116 are joined at their extreme ends to the unslotted outermost flanges 117 of evaporator C, and are inclined similarly to the remaining baffles 120. Baffles 120 are welded at their respective ends to the adjoining flanges 117, and at their inner and outer edges they are welded to the shells 37 and 116 respectively.

The baffle 120 in the foremost shell is positioned immediately below the refrigerant inlet port 111, in such a manner as to cause the liquid entering therethrough to flow in a counter clockwise direction through the annular passage formed by the foremost shell 116, thence through the slot 119 joining the passage bounded by the two foremost shells, thence in a counter clockwise direction around the portion of the helical passage bounded by the second shell 116 due to the positioning of the second baffle 120, and thence similarly through the remaining shells 116 until the refrigerant reaches the discharge 112 in a gaseous state.

III. *Agitator*

The agitating, whipping, scraping and unloading mechanism on the inside of the processing cylinder or shell 37, consists generally of an outer dasher agitator or scraping and unloading member, and an inner dasher or agitator, whipping and beating member, which members are arranged to rotate in opposite directions. The rear head 40 of cylinder 37 is provided with a rearwardly extending bearing neck 48 about the central aperture 49 to rotatively support the quill shaft 36 and inner shaft 35, which shafts 35 and 36 drive the inner and outer dasher members. On the end of the quill shaft 36 extending into the shell 37 is provided a centrally apertured axially aligned end plate or spider 50, which is formed integrally with the quill shaft 36 and to which the outer dasher mechanism support ring or annulus 51 is removably affixed by stud bolt 52 carried by end plate 50. The ring or annulus 51 is provided with two diametrically opposed, recessed brackets 109 into which recesses the rear portions of two parallel unloading bars 53 are affixed which bars are arranged parallel with the axis of rotation of the agitator mechanism having their outer faces closely adjacent to the inner periphery of processing shell 37. The parts 53 on their outer surfaces carry diagonally disposed unloading wings 54, which wings 54 extend into close proximity of the shell 37, and are so disposed angularly with respect to the axis of rotation of the agitator mechanism as to impel the contents of the processing shell 37 forwardly upon the rotation of the outer dasher or agitator mechanism. The front ends of the unloading bars 53 are affixed to the front support spider 55, which is provided with two pairs of oppositely directed arms arranged at right angles to each other mounted on a centrally apertured hub 56. The one pair of arms of front spider 55 are provided at their outer ends with recessed brackets 109' to support the front end of the unloading bars 53. These supporting arms are inclined to the axis of the dasher mechanism so as to impel the contents of the shell 37 rearwardly upon rotation of the outer dasher mechanism, in contrast to the forward motion imparted to the contents of the shell 37 by the unloading wings 54. The remaining pair of arms of the front spider 55 extend outwardly towards the inner periphery of the shell 37, and are provided at their outer ends with aperture 107 constituting bearings for the front end pivots 57 of the scraping blades 58, which blades may be of any conventional type. Pivots 57 are mounted in offsets at the rear edge of the blade 58 and the front leading edge of the blade extends through the kerf 59 of the bifurcated ends 60 of the blade supporting arms of the spider 55, whereby the rotation of the blades 58 about the pivots 57 is limited and the position of the blades 58 with respect to the remaining portions of the dasher mechanism is predetermined. The rear pivots 57 of the blades 58 are supported in diametrically opposed lugs 61 on the outer periphery of the rear supporting spider or plate 50. Lugs 61 are disposed at an angle of 90° from unloading bar support brackets 59 on the annulus 51, which is removably affixed to the end plate or spider 50. The lugs 61 are provided with bearing aperture 62 for the rear pivots 57 of the scraping blade 58. The inner shaft 35 of the agitator mechanism is supported at its front end by a conical stud bearing 63 mounted free to rotate on the front end of shaft 35 and telescoping into the conical bearing seat 47 in the door 41. At its opposite end the inner shaft 35 is supported in a bushing 64 recessed into the inner end of the quill shaft 36. Bushing 64 is provided with an outwardly turned flange 65 overlapping the central portion of the front face of the rear supporting spider or plate 50. Two sets of beater blades 66 and 67 are mounted at spaced intervals along the central portion of shaft 35, alternately arranged, with one set disposed at an angle of 90° to the other. The beater blades 66 and 67 are so inclined to the axis of shaft 35 that upon rotation thereof they will impel the contents of the shell 37 in a rearwardly direction. To facilitate and supplement the whipping of the ice cream, whipping rods 68 are provided. These rods are carried in pairs by the beater blades 66 and 67 by passing them through opening 69 in the blades, to which blades they may be affixed by any suitable means, such, for example, as by welding. The rear free ends of all the whipping rods 68 are secured to a 4-arm spider 70 mounted on shaft 35 adjacent the end plate 50.

The apertured hub 56 for the front spider 55 is provided with a squared inner surface to engage the squared outer surface 71 of the bushing 72 freely mounted on the shaft 35 to rotate with and support the front end of the outer dasher mechanism upon the front end of the shaft 35. The bushing 72 on its inner end is provided with transverse oppositely disposed slots 73, which engage the lug 74 of the annulus 75 mounted on shaft 35 inwardly of the bushing 72 and abutting against the hub of the front beater blades 66. The annulus 75 is provided with an outwardly extending flange 76 intermediate which flange, and the adjacent face of the hub 56, a coil spring 77 is mounted telescopically upon the end of bushing 72 and over shaft 35. Shaft 35 is biased for rearward motion relative to the outer dasher mechanism by spring 77 to assure the engaging of the annulus 106, keyed to the rear portion of shaft 35, in a sealing engagement with the outwardly turned flange 65 of bushing 64 recessed in the inner end of the quill shaft 36. The front end of the bushing 72 abuts against the rear face of the stud bearing 63, which is freely mounted on shaft 35 and locked thereon by key ring 78 removably mounted in a groove 79 in the extreme front portion of the shaft 35. The front end of bushing 72 is provided with an outwardly turned flange 80 to retain a second coil spring 81, which embraces the outer portion of bushing 72, intermediate the outwardly turned flange 80 and the adjacent face of the hub 56 of the front spider 55. Upon closing the door 41 affixed to the front head 39 of shell 37 the conical bearing seat 47 engages the freely mounted stud bearing 63 moving it rearwardly on the shaft 35 together with the freely mounted bushing 72 as the closing of the door 41 progresses. This procedure compresses the coil spring 81 to bias the outer dasher assembly for motion in a rearwardly direction, thereby sealingly engaging the rear face of spider 50 with the annular sealing element 82 in the front inner face of the rear cylinder head 40. By this arrangement the sealing of the rotary elements sealing the entrance apertures for the quill shaft 36 through the rear cylinder head 40 and the aperture for the shaft 35 through the quill shaft 36 is assured by the automatically adjustable spring means, which arrangement is one of the important elements of this invention.

IV. *Cooling system*

It is of course obvious that the evaporator C may be supplied with other types of cooling agents to effect a satisfactory operation of the freezing processes within the shell 37. However, the illustrations clearly set out a portion of an ammonia absorption system and the controls therefor.

In the preferred embodiment of the invention as illustrated high pressure liquid anhydrous ammonia is supplied from any satisfactory compressor condenser unit (not shown) through supply pipe 83, from which it passes through a coil 84 of the precooler 85, thence through a conduit 86 to a needle valve 87 provided with a bypass through which bypass the liquid may pass during normal automatic operation to valve 88 through conduit 89, thence through an automatic liquid refrigerant flow regulating valve 90 to a control valve 91 through conduit 92, and thence through the special evaporator connection 93 from which it passes through the evaporator inlet port 113 into the passage 110 of evaporator C.

The refrigerant which has passed through the evaporator "C" is discharged from the port 112 of the evaporator through conduit 94 to the precooler 85, in which any unevaporated liquid refrigerant will be evaporated by precooling the liquid refrigerant supply in coil 84. From precooler 85 the refrigerant gas is discharged to the compressor condenser unit (not shown) through conduit 95.

As a matter of safety, a poppet valve 96, conventionally referred to as a safety valve, is joined to conduit 92 by special conduit 97, and arranged to discharge, when in operation, into the exhaust conduit 94. Valve 96 as just stated is of the conventional safety type valve, and is so adjusted as to limit the liquid pressure in conduit 92 to a predetermined value.

The automatic thermal liquid flow valve 90, as illustrated in detail in Figure 2, is in the refrigerant supply line and is of the commercial type offered on the market under the trademark of "Alco," and the details thereof do not form a part of this invention. Valve 90 will be described only sufficiently to indicate that the liquid passing through the valve is regulated by a conical valve 98 seating in a conical valve seat in the flow passage 100. The movement of the valve 98 is controlled through valve stem 101, which is fixed to a spring loaded diaphragm 102 actuated by the pressure exerted upon it by the fluid in tube 104 communicating with the thermal sensitive bulb 103 mounted in heat exchange relation on the exhaust conduit 94.

In the event that it is desired to manually operate the evaporator C, the valve 88 ahead of the automatic thermal valve 90 is closed, and the needle valve 87 is adjusted to regulate a flow of liquid refrigerant to the conduit 92 as desired through the conduit 105 connected to the discharge port of the needle valve. The inlet port of valve 87 is associated with the beforementioned by-pass, forming a part thereof, which by-pass is not shown but is constructed in accordance with conventional valve design.

It will of course be evident that some of the chief advantages of the present invention reside in the method of constructing the evaporator C and the results inherent in that construction as well as the results residing in the construction of the dasher or agitating mechanism mounted inside of the freezing chamber or shell 37, and in the general system of controlling the refrigeration applied to the processing chamber or shell 37.

The evaporator C is made by welding the baffles 120 onto the outer periphery of the shell 37 at an angle to the axis of the shell 37 and in spaced relation one to another staggered rearwardly and downwardly as shown in Figure 10. The baffles 120 as a group extend rearwardly and downwardly in uniformly spaced staggered relation one to another in a somewhat helical alignment with the foremost baffles 120 positioned approximately at the top of the forward end of the shell 37. The rearmost baffle 120 is positioned approximately at the bottom of the rear portion of the shell 37. The front discontinuous or split ring 116 having an inwardly directed flange 117 at both of its edges is next superimposed over the forward end of the shell 37 with the ends 121 of the split ring 116 embracing the front baffle 120. The edges of the inwardly turned flange 117 of the front ring 116 are each welded to the periphery of the shell 37 and the ends 121 of the ring 116 are joined to the outer edge of the baffle 120 and the ends of the baffle 120 are each welded to the adjacent flange 117. The lower end of the rear flange 117 of the front ring 116 is welded to the front edge of the second baffle element 120 positioned immediately adjacent the rear edge of the front ring 116. The second ring 116 is then superimposed over shell 37 with the ends 121 of the second ring 116 embracing the outer edge of the second baffle 120 and having the front edge 118 of the second ring 116 abutting against the rear edge of the front element 116. The front edge 118 of the second element 116 is then welded to the rear edge of the first element 116 and the ends 121 of the second element 116 are welded to the upper edge of the second element 120. The ends of the flange 117 of the second element 116 which defines the top edge of the slot 119 in the second element 116 is then welded to the rear edge of the second baffle 120 and the other end of the same flange 117 is welded to the front edge of the third baffle 120. The third and other elements 116 are mounted on shell 37 in like manner with the exception of the last and rearmost element 116 which is not provided with a slot 119 in its flange 117. In the instance of the last ring-like element 116 the rear flange 117 is welded to the shell 37 throughout its entire length which in this instance extends throughout the entire length of element 116 from each of the edges 121 thereof. The unique method of constructing an evaporator for an ice cream freezer as just described forms a passage 110 which is made continuous throughout all of the elements 116 by providing connecting bypasses in the form of slots 119 in the flanges 117 intermediate any two adjacent hoop or shell-like elements 116 so associated with defining baffles 120 as to direct the refrigerant flowing through the passages 110 in a circuitous helical path in intimate contact with the outer periphery of the freezing shell 37. Due to the welding of the inwardly directed flange 117 to the outer surface of the shell 37, the flanges 117 in actuality constitute heat exchange fins extending into the evaporator C, thereby greatly increasing the heat transfer efficiency of the evaporator due to the inherent advantages incidental to the structure of the evaporator, whereby the efficient heat transfer surface has been increased.

In the conventional type of freezer it is common practice to provide packing glands to seal ports of entrance of the agitator drive shafts into the freezing chamber. Such packing glands usually embody certain unsanitary features. In the present invention, sanitary automatically adjustable rotary seals are provided which permit the removal and thorough cleaning of all working parts which contact the material handled within the processing chamber. This is considered an important improvement in that in the normal operation of an ice cream freezer it is essential that all parts which contact the ice cream must be frequently cleaned, in which instance it is of course necessary to remove such parts from the freezing cylinder. To facilitate the cleaning of the agitating mechanism, it has been made demountable, as clearly shown in Figure 7. From Figure 7, it will be apparent that in assembling the agitator mechanism the inner shaft 35, carrying the inner dasher mechanism at its midportion, is telescoped into the quill drive shaft 36, with the rear sealing bearing 106 fixed to the shaft 35 immediately behind the inner agitator mechanism contacting the flange 65 of bushing 64 recessed into the quill shaft 36 and abutting against the front face of the rear spider 50 formed integrally with the quill shaft 36. Annulus 75 and spring 77 are then telescoped over the front end of shaft 35 and the outer dasher assembly is telescoped over the inner dasher assembly with the hub 56 of the front spider 55 telescoping over the front end of the shaft 35 until the stud bolts 52 on the rear end spider 50 have engaged the associated bolt holes 108 in the rear supporting annulus 51. The scraping blades 58 are then placed in position between the front and the rear pivot supports 62 and 107 with the pivots 57 registering therewith, and the outer dasher element is then drawn into place by tightening the nuts 52' on the bolts 52, thereby compressing spring 77, biasing the inner dasher element rearwardly against the rear plate of the outer dasher element to hold the annulus 106 in sealing engagement with the flange 65 of the bushing 64. The outer coil spring 81 is then telescoped over the bushing 72, which is then telescoped over the end shaft 35 into the keyed aperture of hub 56 of the front spider 55 until the slots 73 in the inner end of the bushing 72 engage the axially extending lugs on the annulus 75. To complete the assembly of the agitating mechanism the stud bearing 63 is telescoped over the end of the shaft 85, compressing spring 81 sufficiently to permit the insertion of the key ring 78 into the groove 79 at the extreme forward end of the shaft 35.

The assembled dasher is then inserted into the freezing shell 37 with the quill shaft 36 telescoped through the bearing neck 48 in the rear cylinder head 40 and into the quill shaft 23 provided with a squared inner surface to drivingly engage the squared outer surface of the end of the quill shaft 36. This arrangement provides the driving connection for the outer dasher element and similarly, and at the same time, the squared end of the inner shaft 35 engages the squared socket in the front end of the sprocket wheel shaft 25 to provide the driving connection for the inner agitator element. Upon closing the freezer door 41, the conical bearing seat 47 forces the stud bearing 63 against the front end of the bushing 72 to further compress the spring 81, thereby biasing the outer dasher mechanism for movement in a rearwardly direction, holding the rear face of the rear spider plate 50 in sealing engagement with the sealing bearing 82 in the inner face of the rear processing chamber head 40. In the operation of the agitator and whipping mechanism, as previously pointed out, the inner and outer members therefore may be rotated in opposite directions. For this reason it has been advisable to supply the special spring engaging flanges 80 and 76 or the members 72 and 75 respectively, to engage the ends of the springs 77 and 81 thereby to rotate the springs with the outer dasher mechanism due to the keyed engagement of the bushing 72 with the inner periphery of the hub 56 of the front spider 55, and transfer the biasing pressure of the springs through the flanges 76 and 80 to the oppositely rotating element of the inner agitator mechanism. Such construction will avoid the winding or unwinding of the springs 77 and 81, which winding or unwinding would occur if the flanges beforementioned did not rotate with the front spider 55, due to the fact that the ends of the springs 77 and 81 adjacent the spider 55 would engage it and tend to rotate therewith, while the opposite ends would engage oppositely rotating elements. The rotation of the bushing 72 with the hub 56 is secured by providing squared faces 71 on the outer surface of the bushing 72 to engage complementary faces on the interior of the hub 56.

In the operation of the freezer, ice cream mix supplied to the reservoir is admitted to the freezing or processing chamber defined by the shell 37 through valve 46 and the refrigerant is started or stopped by means of the stop valve 91, which valve admits the precooled refrigerant from the automatic control valve 90 into the conduits associated with the evaporator C. Any unevaporated or liquid refrigerant which may pass through the evaporator C passes through the conduit 94 into the precooler 85 where it will be evaporated to avoid the passage of any liquid refrigerant into the exhaust line 95 associated with the compressor condenser unit (not shown). This arrangement is well adapted for the efficient and satisfactory operation of batch freezing processes in which frequent starting and stopping of the freezing operation is essential. In the event manual control of the refrigeration system is desired the automatic thermal control valve 90 is turned off by closing valve 88 immediately ahead of valve 90 and opening the needle valve 87, which is then used to regulate the flow of liquid refrigerant to the evaporator C through the stop valve 91.

The foregoing detailed description has been given for clearness of understanding only, and no unnecessary limitations shall be understood therefrom. Various changes in arrangement of the various elements of the freezer is shown and described to explain the invention may be made in accordance with the common knowledge of those skilled in the art, and yet come within the scope of the invention as set forth in the appended claims.

I claim as my invention:

1. A processing device comprising a processing chamber having a door at one end thereof, agitator means supported for movement within said chamber, agitator support means carried by said door for maintaining said agitator means in a predetermined radial position within said chamber, and means biasing said agitator means for yieldably maintaining it in a predetermined axial position within said chamber.

2. In an ice cream freezer, the combination of a processing chamber having a door at one end thereof, agitator means supported for rotary movement within said chamber, agitator support means carried by said door, a bearing carried by said agitator means to cooperate with said support means, and spring means biasing said agitator means for yieldably maintaining it in a predetermined axial position within said chamber and for maintaining said bearing within said support means when said door is closed.

3. An ice cream freezer having a door at one end thereof and an apertured head at the opposite end thereof, agitator means supported for rotary movement within said chamber and having supporting and driving means extending from said chamber through the aperture in said head, bearing means carried by said apertured head and encompassing the aperture in said head, complementary bearing means carried by said agitator means to react with said bearing means carried by said apertured head, and means biasing said agitator means for movement toward said apertured head when said door is closed and for yieldably maintaining said bearing means and complementary bearing means in sealing engagement.

4. A processing device comprising, in combination, a processing chamber, agitator means having an end plate mounted for rotary movement within said chamber, agitator support and driving means extending through an aperture in a wall of said chamber, sealing means encompassing said aperture, said sealing means comprising a bearing element in said chamber wall, and spring means for yieldably maintaining said end plate and said sealing means in sealing engagement to seal the aperture in said chamber wall.

5. An ice cream freezer comprising a processing chamber, agitator means supported for rotary motion within said chamber, a door at one end of said chamber, a bearing seat on said door, a bearing on said agitator means for seating in said bearing seat, and spring means biasing said bearing for yieldably maintaining it in said bearing seat when said door is closed.

6. In an ice cream freezer, the combination of a processing chamber having an apertured wall at one end thereof and having a door at the other end thereof, agitator means removably supported within said chamber, driving and supporting means for said agitator means extending from the chamber through the aperture in said wall, operative sealing means for the aperture in said wall including a portion of said agitator means, a bearing for the end of said driving and supporting means extending into said chamber, a bearing seat on said door for supporting said bearing in operative position when said door is closed, and spring means biasing said bearing for yieldably maintaining it in said bearing seat when said door is closed.

7. In an ice cream freezer, the combination of a processing chamber having an apertured wall at one end thereof and having a door at the other end thereof, agitator means removably supported within said chamber, driving and supporting means for said agitator means extending from the chamber through the aperture in said wall, operative sealing means for the aperture in said wall including a portion of said agitator means and a bearing element embracing the aperture in said wall, a second bearing for the end of said driving and supporting means extending into said chamber, a bearing seat on said door for supporting said second bearing in operative position when said door is closed, and spring means subject to pressure of said bearing when said door is closed for yieldably maintaining the sealing means sealing the aperture in said wall in sealed position.

8. In combination, a processing chamber having an apertured end wall, agitator means and sealing means having inner and outer rotary elements supported within said chamber, shaft means for driving said agitator means extending from said chamber through the aperture in said end wall, and spring means carried by said agitator means for biasing the same for axial motion within said chamber, said sealing means being arranged upon said agitator means to seal the aperture in said end wall around said drive shaft when said agitator means is biased axially.

9. An agitator for an ice cream freezer comprising an inner agitator element mounted on a shaft, a support for one end of said shaft, an outer agitator element supported at one end thereof for rotary motion relative to said inner agitator element by a support spider swiveled to the shaft of said inner element adjacent said support therefor, support means for the opposite end of said outer agitator element removably attached to an apertured end plate of a hollow drive shaft for said outer element embracing the other end of the shaft of said inner element to support the same, and spring means carried by said agitator elements biasing the inner element for axial movement relative to the outer element to maintain them in relative axial position with respect to one another.

10. In combination, a processing chamber having an apertured end wall, agitator means having inner and outer relatively rotatable elements and housed within said chamber, inner and outer shaft means extending into said chamber through the aperture in said end wall for relatively rotating said inner and outer agitating elements respectively, rotary sealing means encompassing said inner and outer shaft means respectively to sealingly engage complementary rotary sealing means carried by said outer shaft and said end wall respectively, and spring means for biasing said sealing means for maintaining them in sealing engagement with said complementary sealing means when said agitator means is in operative position within said chamber.

ARTHUR H. BOILEAU.